US009260280B2

(12) United States Patent  
West

(10) Patent No.: US 9,260,280 B2  
(45) Date of Patent: Feb. 16, 2016

(54) DRAGSTER BUDDY

(71) Applicant: Tony West, Red Boiling Springs, TN (US)

(72) Inventor: Tony West, Red Boiling Springs, TN (US)

(*) Notice: Subject to any disclaimer, the term of this patent is extended or adjusted under 35 U.S.C. 154(b) by 374 days.

(21) Appl. No.: 13/889,559

(22) Filed: May 8, 2013

(65) Prior Publication Data

US 2013/0327999 A1 Dec. 12, 2013

Related U.S. Application Data

(60) Provisional application No. 61/657,114, filed on Jun. 8, 2012.

(51) Int. Cl.
| | |
|---|---|
| *B60P 1/48* | (2006.01) |
| *B66F 5/02* | (2006.01) |
| *B62B 1/10* | (2006.01) |
| *B62B 3/10* | (2006.01) |
| *B66D 1/00* | (2006.01) |
| *B62B 5/00* | (2006.01) |
| *B62B 3/04* | (2006.01) |

(52) U.S. Cl.
CPC ... *B66F 5/02* (2013.01); *B62B 1/10* (2013.01); *B62B 3/04* (2013.01); *B62B 3/10* (2013.01); *B62B 5/0003* (2013.01); *B66D 1/00* (2013.01); *B62B 2202/90* (2013.01); *B62B 2203/10* (2013.01); *B62B 2203/72* (2013.01)

(58) Field of Classification Search
USPC .......................................................... 254/8 R  
See application file for complete search history.

(56) References Cited

U.S. PATENT DOCUMENTS

| | | | | | |
|---|---|---|---|---|---|
| 320,418 | A | * | 6/1885 | Walker | 254/4 C |
| 368,883 | A | * | 8/1887 | Forbes | 254/4 C |
| 1,394,375 | A | * | 10/1921 | Torkildson | 254/1 |
| 1,563,862 | A | * | 12/1925 | Jensen | 254/6 B |
| 1,650,810 | A | * | 11/1927 | Weaver | 414/428 |
| 1,674,397 | A | * | 6/1928 | Hopkins | 254/6 B |
| 3,385,401 | A | * | 5/1968 | Campbell et al. | 187/222 |
| 3,702,037 | A | * | 11/1972 | Toy et al. | 446/470 |
| 5,116,264 | A | * | 5/1992 | Wiederrich et al. | 108/23 |
| 5,441,378 | A | * | 8/1995 | Puls | 414/458 |
| 5,681,139 | A | | 10/1997 | Szanto | |
| 6,494,437 | B1 | * | 12/2002 | Boyer | 254/323 |
| 6,981,695 | B1 | * | 1/2006 | Hedlund et al. | 254/323 |
| 7,543,798 | B2 | * | 6/2009 | Cunningham | 254/266 |
| 7,913,978 | B1 | * | 3/2011 | Trihey et al. | 254/323 |
| 7,942,383 | B2 | * | 5/2011 | Tharp | 254/280 |
| 8,167,528 | B2 | * | 5/2012 | Keeven et al. | 414/642 |
| 8,573,360 | B1 | * | 11/2013 | Yoder | 182/45 |
| 9,055,738 | B1 | * | 6/2015 | Woller et al. | |
| 2003/0039535 | A1 | * | 2/2003 | Gourand | 414/543 |

(Continued)

*Primary Examiner* — Lee D Wilson  
*Assistant Examiner* — Alvin Grant  
(74) *Attorney, Agent, or Firm* — Buckingham, Doolittle & Burroughs, LLC

(57) ABSTRACT

A loading and unloading device is disclosed that provides users with a convenient and hands-free way to move a dragster or other suitable vehicle in and out of a trailer. The loading and unloading device comprises a dolly, a winch, and a pulley system. The winch is secured to the dolly, and functions to secure a winch cable to a dragster and pull the dragster in toward the dolly. Furthermore, a pulley system is secured to the dolly for redirecting the winch cable from the winch. The dolly can also comprise an arm that is secured to either end of the dragster and that raises or lowers either end of the dragster. The dolly can also comprise wheels secured to front and rear axles of the dolly to allow for ease in transportation of the device.

18 Claims, 4 Drawing Sheets

(56) References Cited

U.S. PATENT DOCUMENTS

| | | |
|---|---|---|
| 2003/0053898 A1 | 3/2003 | Wamsley |
| 2004/0061100 A1 | 4/2004 | Keaton et al. |
| 2010/0178141 A1 | 7/2010 | Wilson |
| 2010/0284772 A1 | 11/2010 | William |

* cited by examiner

DRAGSTER BUDDY

CROSS-REFERENCE

This application claims priority from Provisional Patent Application Ser. No. 61/657,114 filed Jun. 8, 2012.

BACKGROUND

Individuals typically need help from another person when loading and unloading a dragster or other vehicle from a trailer. This process can be strenuous and laborious, and may require both individuals to bear the weight of the dragster. If individuals attempt to do this, or if individuals aren't careful, they can scrape the dragster along the floor, possibly damaging the floor of the trailer and/or the body of the dragster. Both dragsters and trailers can be extremely costly to repair or replace. An effective solution is necessary.

The present invention provides individuals with a convenient and hands-free way to move a dragster in and out of a trailer. This device comprises a powered dolly-like device that can be hooked to the front of a dragster. The dolly comprises an arm that can lift the dragster up and remove it from a trailer without causing the dragster to drag on the surface of the trailer. This device also enables individuals to move the dragster in and out of the trailer without needing the assistance of another person and without causing damage to the dragster's body or frame.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a loading and unloading device that provides users with a convenient and hands-free way to move a dragster or other suitable vehicle in and out of a trailer. The loading and unloading device comprises a dolly, a powered winch, and a pulley system. The winch is secured to the dolly, and functions to secure a winch cable to a dragster and pull the dragster in toward the dolly. Furthermore, the dolly comprises a pulley system secured to the dolly for moving the dragster. The pulley system redirects the winch cable from the winch. Thus, the winch cable from the winch is redirected through the pulley system and then secured to the dragster. Once secured, the winch cable would act to pull the dragster in toward the dolly using the pulley system.

In a preferred embodiment, the dolly comprises an arm that is controlled by the winch and able to pivot up and down. Typically, the arm is secured to the dragster and pulls the dragster up to a first position and lowers the dragster down to a second position via the winch and pulley system thereby enabling the user to lift or lower one end of the dragster. Further, the arm typically comprises a stopper that prevents the arm from over-rotating and allows the dragster to rest at a slight angle in the first position and allows the dragster to be lowered down to the second position when a user stops applying or reverses the winch. Additionally, the dolly can comprise wheels secured to front and rear axles of the dolly to allow for a user to easily transport the powered dolly from one location to another. The dolly can also be transported with the dragster in tow.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
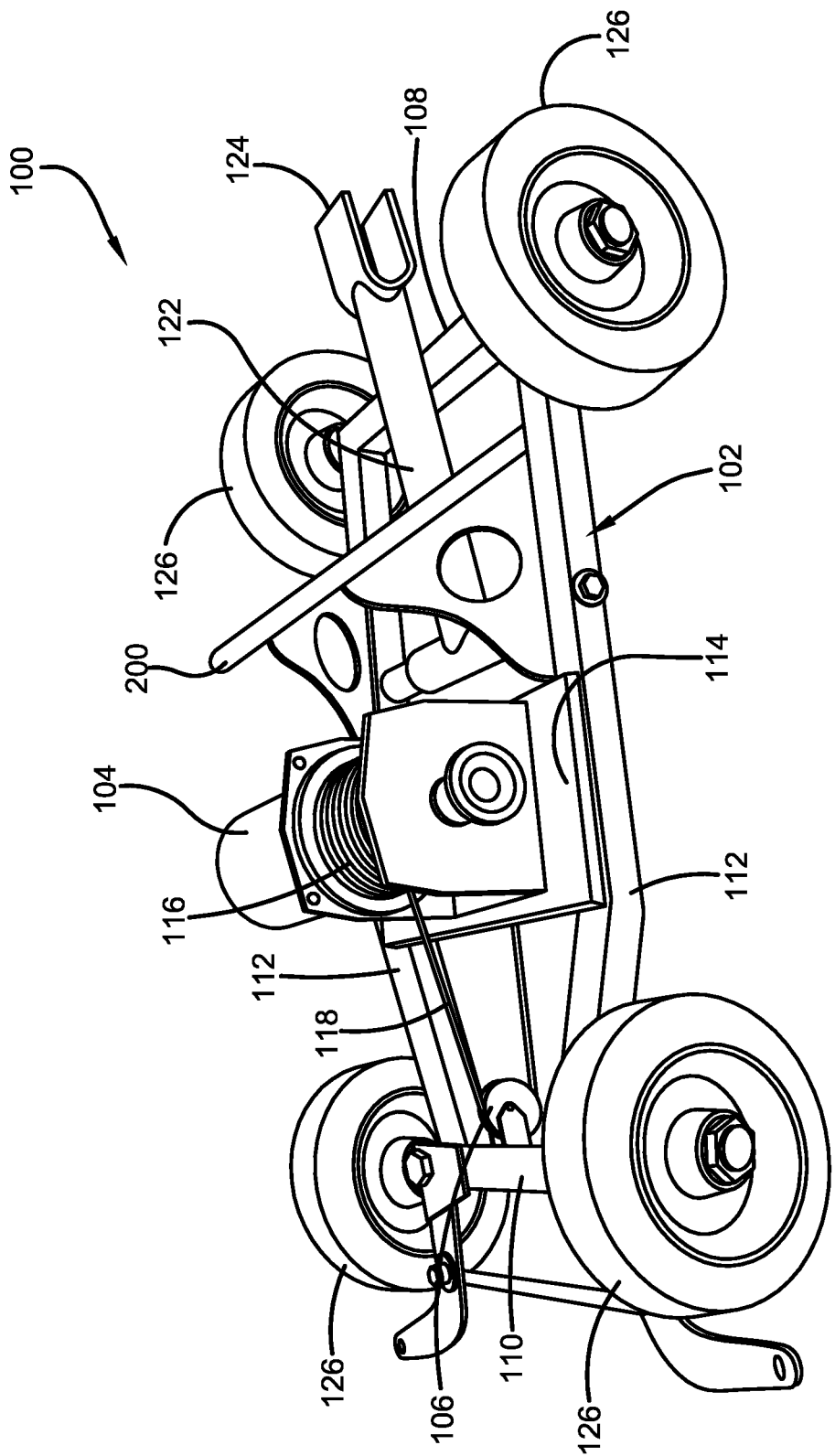
FIG. 1 illustrates a side perspective view of the loading and unloading device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

A loading and unloading device is disclosed that provides users with a convenient and hands-free way to move a dragster in and out of a trailer and from one location to another. This device comprises a dolly-like device that can be hooked to a dragster. The dolly comprises an arm that can lift the dragster up and remove it from a trailer without causing the dragster to drag on the surface of the trailer. This device also enables users to move the dragster in and out of the trailer without needing the assistance of another individual and without causing damage to the dragster's body or frame, or the trailer.

Specifically, the loading and unloading device comprises a dolly, a winch, and a pulley system. The winch is secured to the dolly, and functions to secure a winch cable to a dragster and pull the dragster in the general direction of the dolly. Furthermore, a pulley system is secured to the dolly for redirecting the winch cable from the winch, and reducing the stress on the winch motor. The dolly can also comprise an arm that is pivotally secured to the dragster and that raises the dragster up to a first position and lowers the dragster down to a second position via the operation of the winch. The dolly can also comprise wheels secured to front and rear axles of the dolly to allow for ease in transportation of the device. Exact dimensions or materials used may vary to suit manufacturing needs and/or user preference.

Figure 2:
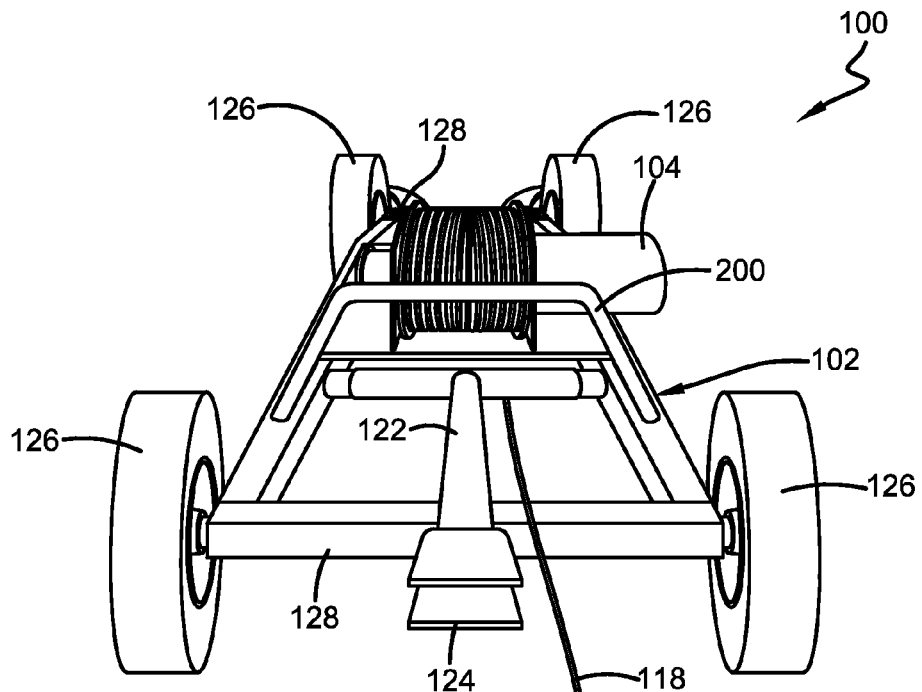
FIG. 2 illustrates a front perspective view of the loading and unloading device in accordance with the disclosed architecture.
Figure 3:
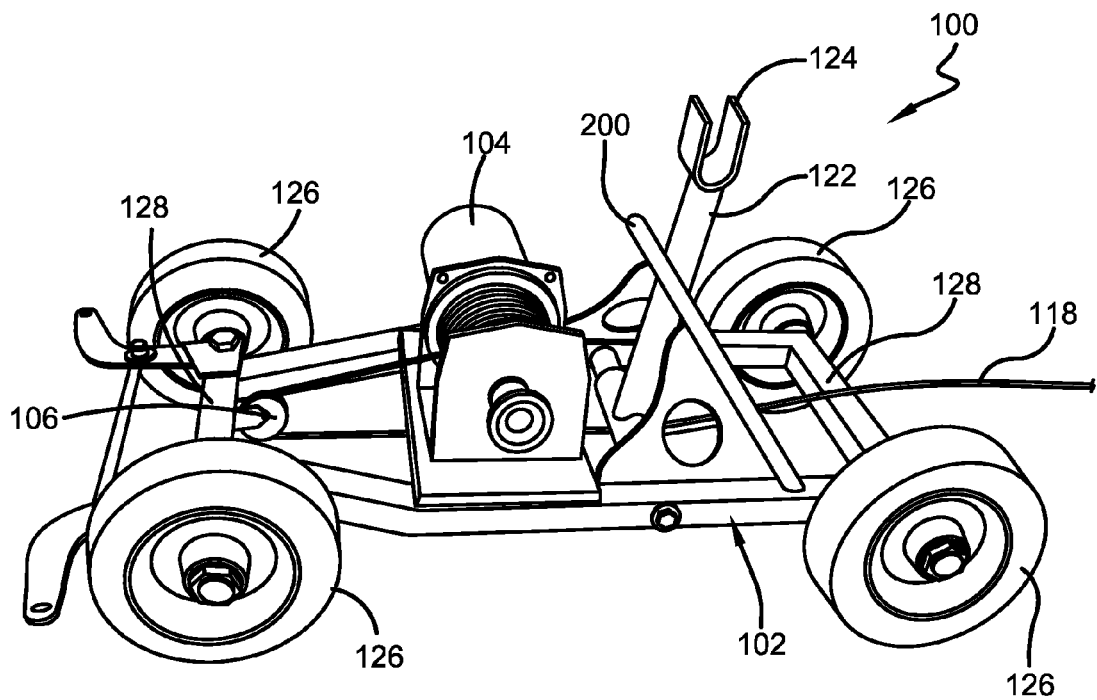
FIG. 3 illustrates a side perspective view of the loading and unloading device in accordance with the disclosed architecture.

Referring initially to the drawings, FIGS. 1-3 illustrate a loading and unloading device 100 that provides users with a convenient and hands-free way to move a dragster 120 or other suitable vehicle in and out of a trailer (not shown) and/or for lifting one end of the dragster. The loading and unloading device 100 comprises a dolly 102, a winch 104, and a pulley system 106. The dolly 102 comprises a first end 108 and a second end 110, opposing sides 112, and a middle section 114. Typically, the dolly 102 is an elongated frame structure, but could be any suitable structure as is known in the art. Further, the dolly 102 is typically rectangular in shape, however any other suitable shape can be used as is known in the art without affecting the overall concept of the invention.

The dolly 102 would generally be constructed of aluminum, stainless steel, or carbon fiber, etc., though any other suitable material may be used to manufacture the dolly 102 as is known in the art without affecting the overall concept of the invention. The dolly 102 can also comprise a variety of colors and designs to suit user and manufacturing preference. Further, the dolly 102 is approximately 10 inches long as measured from the first end 108 to the second end 110, and approximately between 20 inches wide as measured from opposing sides 112.

Additionally, the dolly 102 comprises a middle section 114, wherein a winch 104 is typically secured to the middle section 114 (as shown in FIG. 1). However, the winch 104 can be secured to any suitable position on the dolly 102 as is known in the art, as long as the winch 104 can function to secure a winch cable 118 to a dragster 120 and pull the dragster 120 in the general direction of the dolly 102. The winch 104 functions as a typical winch that is known in the art and comprises a winch cable 116, a roller 116 for winding up the winch cable 118, and a motor for turning the roller 116. The winch 104 would be secured to the dolly 102 via welding, fasteners, etc., or any other suitable securing means as is known in the art. Typically, the winch 104 is an electrically powered winch, but can be any suitable type of winch as is known in the art. Further, the winch 104 can be powered by a remote (not shown) and comprises a on/off power switch (not shown).

Furthermore, the dolly 102 comprises a pulley system 106 (or assembly) secured to the second end 110 of the dolly 102 for moving the dragster 120. The pulley system 106 can be secured to any suitable position on the dolly 102. The pulley system 106 functions as a typical pulley system that is known in the art and redirects the winch cable 118 from the winch 104. The pulley system 106 would be secured to the dolly 102 via a pin, etc., or any other suitable securing means as is known in the art that allows the pulley system 106 to rotate about its axis. Thus, the winch cable 118 from the winch 104 is redirected through the pulley system 106 and then secured to the dragster 120 (as shown in FIG. 2). The winch cable 118 would be secured to the dragster 120 via hardware, etc., or any other suitable securing means as is known in the art. Once secured, the winch cable 118 would act to pull the dragster 120 in the general direction of the dolly 102.

Additionally, the dolly 102 comprises an arm 122 that is controlled by the winch 104 and able to pivot up and down (as shown in FIG. 3). Typically, the arm 122 is pivotally secured to the middle section 114 of the dolly 102. However, the arm 122 can be secured to any suitable position on the dolly 102 as is known in the art, as long as the arm 122 can function to lift one end of the dragster 120 up and down. The arm 122 would be secured to the dolly 102 via a pin, fasteners, etc., or any other suitable securing means as is known in the art that allows the arm 122 to pivot up and down. Typically, the arm 122 is secured to the dragster 120 and raises one end of the dragster 120 up to a first position and lowers the same end of the dragster 120 down to a second position via the powered winch 104. The arm 122 is secured to the dragster 120 via a claw-like member 124, or any other suitable securing means as is known in the art. Further, the arm 122 typically comprises a stopper 200. The stopper 200 prevents the arm 122 from over-rotating and allows the dragster 120 to rest at a slight angle in the first (raised) position and allows the dragster 120 to be lowered down to the second position when a user (not shown) stops applying or reverses the winch 104.

Furthermore, the dolly 102 can comprise wheels 126 secured to front and rear axles 128 of the dolly 102. The wheels 126 allow the dolly 102 to move and be easily transported from one place to another. The wheels 126 can also comprise brakes (not shown) that allow the wheels 126 to be locked into place once the device 100 is moved into the desired position, to prevent any further movement. Further, the wheels 126 can turn the dolly 102 by using the dragster's front wheels which pulls the dolly 102 right and/or left.

Figure 4:
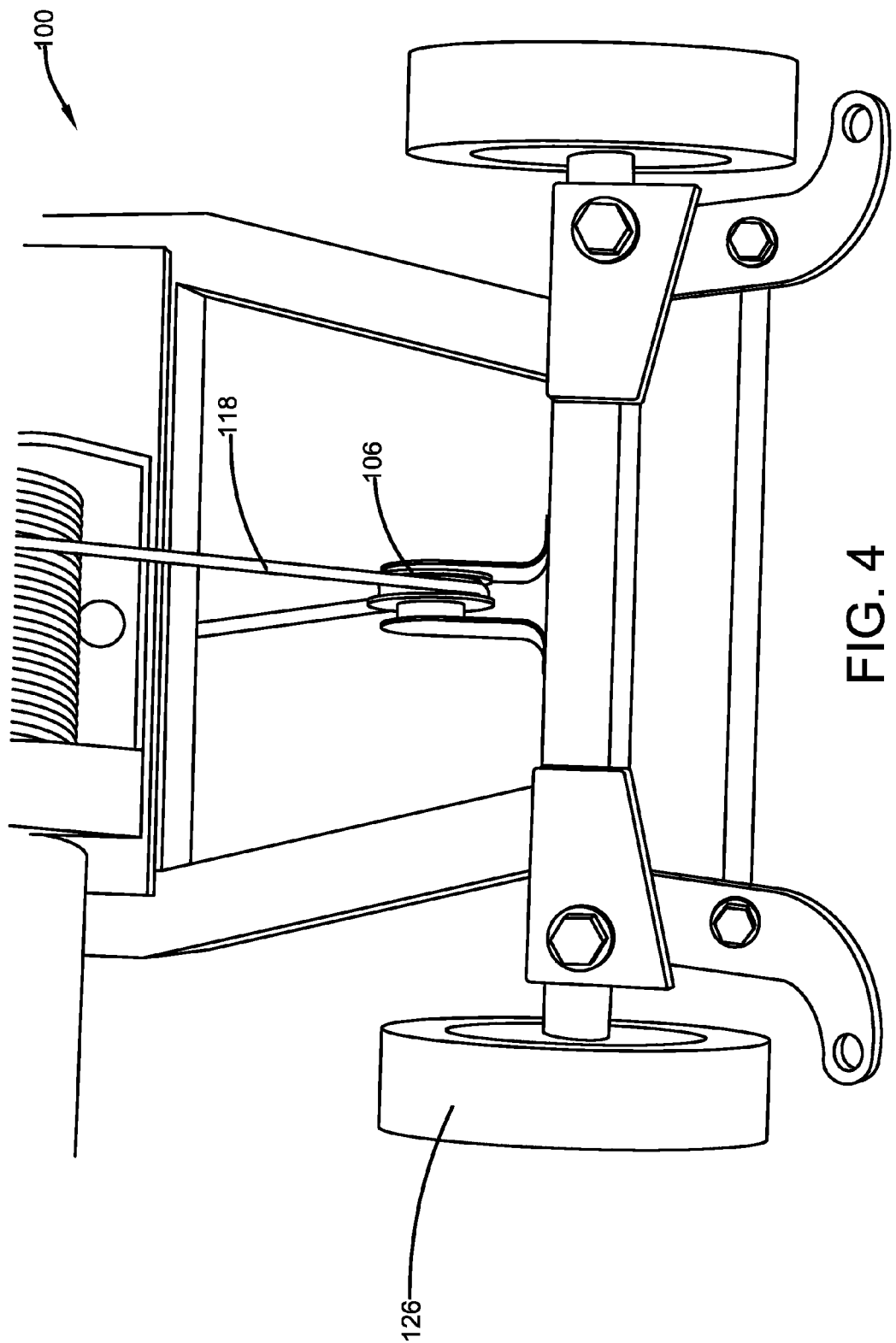
FIG. 4 illustrates a perspective view of the pulley system of the loading and unloading device in accordance with the disclosed architecture.

FIG. 4 illustrates the pulley system of the loading and unloading device 100. As stated supra, the dolly 102 comprises a pulley system 106 secured to the second end 110 of the dolly 102 for moving the dragster 120. The pulley system 106 functions as a typical pulley system that is known in the art and redirects the winch cable 118 from the winch 104. The pulley system 106 would be secured to the dolly 102 via a pin, etc., or any other suitable securing means as is known in the art that allows the pulley system 106 to rotate about its axis. Thus, the winch cable 118 from the winch 104 is redirected through the pulley system 106 and then secured to the dragster 120. The winch cable 118 would be secured to the dragster 120 via hardware, etc., or any other suitable securing means as is known in the art. Once secured, the winch cable 118 would act to pull the dragster 120 in the general direction of the dolly 102.

Figure 5:
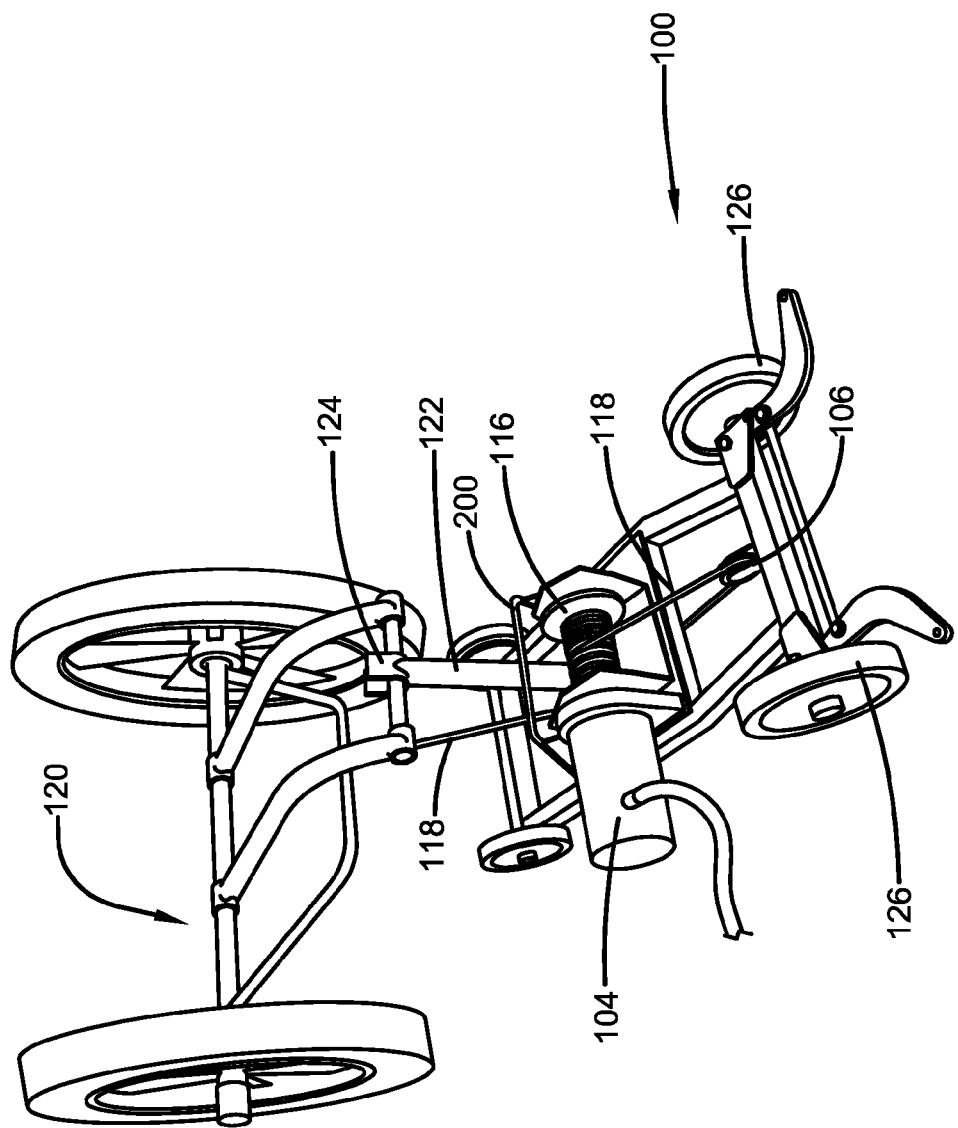
FIG. 5 illustrates a perspective view of the loading and unloading device in use in accordance with the disclosed architecture.

FIG. 5 illustrates the loading and unloading device 100 in use. In operation, a user (not shown) would choose the color and/or specific design of the loading and unloading device 100 that meets their needs and/or wants. The user would then position (via rolling the device 100 on its wheels) the loading and unloading device 100 near the dragster 120 that is to be loaded/unloaded. Once in the desired position, the user can lock the wheels 126 of the device 100, preventing further movement of the device 100. The user then secures the winch cable 118 to the dragster 120, such that the dragster 120 can be pulled in the general direction of the dolly 102. Once the winch cable 118 is secured to the dragster 120, the user then secures the arm 122 to the dragster 120 as well.

Typically, the arm 122 is secured to the dragster 120 via a claw-like member 124. Once the arm 122 is secured to the dragster 120, the arm 122 pivots the dragster 120 up to a first position and lowers the dragster 120 down to a second position via the powered winch 104. A user would turn on the winch 104 which activates the pulley system 106 to draw the dragster 120 in the direction of the device 100, and which activates the arm 122 to pivot the dragster 120 up to a first position. Further, a stopper 200 on the arm 122 would prevent the arm 122 from over-rotating and allows the dragster 120 to rest at a slight angle in the first position.

Once the dragster 120 is moved to the desired position, the user turns off or reverses the winch 104 (or stops applying the winch 104) which allows the dragster 120 to be lowered down to the second position. The user can then unhook (or detach) the arm 122 and the winch cable 118 from the dragster 120. The user then unlocks the wheels 126 and rolls the loading and unloading device 100 away for storage. Thus, the dragster 120 can be lifted and removed from a trailer without causing damage to the dragster 120 or to the trailer, and without needing the assistance of another individual.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device for loading and unloading a dragster, comprising:
   a dolly comprising a first end and a second end and a middle section;
   a winch secured to the middle section;
   a pulley system secured to the first or the second end of the dolly for redirecting a winch cable; and
   an arm that is controlled by the winch and able to pivot up and down; and
   wherein the arm is secured to a dragster via a claw-like member and raises or lowers the first or the second end of the dragster.

2. The device of claim 1, wherein the winch is an electric winch.

3. The device of claim 2, wherein the arm comprises a stopper.

4. The device of claim 3, wherein the stopper prevents the arm from over-rotating and allows the first or the second end of the dragster to rest in a raised position.

5. The device of claim 1, further comprising wheels secured to a bottom surface of the dolly.

6. The device of claim 1, wherein the winch comprises a roller and a winch cable.

7. A device for loading and unloading a dragster, comprising:
   a dolly comprising a first end and a second end and a middle section;
   a winch secured to the middle section;
   a pulley system secured to the first or the second end of the dolly for redirecting a winch cable; and
   an arm that is controlled by the winch and able to pivot up and down; and
   wherein the arm is secured to a dragster and raises or lowers the first or the second end of the dragster.

8. The device of claim 7, wherein the arm comprises a stopper.

9. The device of claim 8, wherein the stopper prevents the arm from over-rotating and allows the dragster to rest in a raised position.

10. The device of claim 7, wherein the winch is an electric winch.

11. The device of claim 7, wherein the arm is secured to the dragster via a claw-like member.

12. The device of claim 7, further comprising wheels secured to a bottom surface of the dolly.

13. The device of claim 7, wherein the winch comprises a roller and a winch cable.

14. A system for loading and unloading a dragster, comprising:
   a dragster; and
   a device for loading and unloading the dragster, wherein the device comprises:
      a dolly comprising a first end and a second end and a middle section;
      a winch secured to the middle section, and comprising a roller and a winch cable;
      a pulley system secured to the first or the second end of the dolly for redirecting the winch cable; and
      an arm that is controlled by the winch and able to pivot up and down; and
      wherein the arm is secured to a dragster via a claw-like member and raises or lowers the first or the second end of the dragster.

15. The system of claim 14, wherein the arm comprises a stopper.

16. The system of claim 15, wherein the stopper prevents the arm from over-rotating and allows the dragster to rest in a raised position.

17. The system of claim 14, further comprising wheels secured to a bottom surface of the dolly.

18. The system of claim 14, wherein the winch is an electric winch.

* * * * *